(12) United States Patent
Lee

(10) Patent No.: US 11,355,105 B2
(45) Date of Patent: Jun. 7, 2022

(54) HOME APPLIANCE AND METHOD FOR VOICE RECOGNITION THEREOF

(71) Applicant: Samsung Electronics Co., Ltd., Suwon-si (KR)

(72) Inventor: Nokhaeng Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 16/726,002

(22) Filed: Dec. 23, 2019

(65) Prior Publication Data

US 2020/0211538 A1    Jul. 2, 2020

(30) Foreign Application Priority Data

Dec. 27, 2018 (KR) .......................... 10-2018-0170454

(51) Int. Cl.
| | |
|---|---|
| *G10L 15/20* | (2006.01) |
| *G10L 15/22* | (2006.01) |
| *G10L 25/84* | (2013.01) |
| *G10L 21/0232* | (2013.01) |

(52) U.S. Cl.
CPC .............. *G10L 15/20* (2013.01); *G10L 15/22* (2013.01); *G10L 21/0232* (2013.01); *G10L 25/84* (2013.01); *G10L 2015/223* (2013.01)

(58) Field of Classification Search
CPC ................. G10L 21/0208; G10L 15/22; G10L 2021/02165
See application file for complete search history.

(56) References Cited

U.S. PATENT DOCUMENTS

| | | | |
|---|---|---|---|
| 5,563,954 A | 10/1996 | Ono et al. | |
| 8,682,657 B2 | 3/2014 | Lim et al. | |
| 9,640,174 B2 | 5/2017 | Noh et al. | |
| 2003/0037382 A1* | 2/2003 | Broker .................... | D06F 33/48 8/158 |
| 2003/0040908 A1* | 2/2003 | Yang ...................... | H04R 3/005 704/233 |
| 2003/0161484 A1* | 8/2003 | Kanamori .............. | H04R 3/005 381/71.7 |
| 2006/0136203 A1 | 6/2006 | Ichikawa | |

(Continued)

FOREIGN PATENT DOCUMENTS

| | | |
|---|---|---|
| CN | 108682428 A | 10/2018 |
| JP | 2012-169960 A | 9/2012 |

(Continued)

OTHER PUBLICATIONS

European Search Report for a corresponding patent application filed in EPO (EP 19902192.4). (Year: 2021).*

(Continued)

*Primary Examiner* — Jialong He

(57) ABSTRACT

A home appliance including a first microphone that is disposed on a surface of a housing, a second microphone that is disposed on an inside of the housing, and a processor configured to perform signal processing for first voice data that is acquired from the first microphone, and perform voice recognition using the signal-processed first voice data. The processor is further configured to generate noise data using second voice data that is acquired from the second microphone and perform signal processing for the first voice data using the generated noise data.

18 Claims, 11 Drawing Sheets

(56) References Cited

U.S. PATENT DOCUMENTS

| | | | |
|---|---|---|---|
| 2007/0274552 A1* | 11/2007 | Konchitsky | H04R 3/007 381/328 |
| 2009/0034748 A1* | 2/2009 | Sibbald | G10K 11/17837 381/71.6 |
| 2010/0266137 A1* | 10/2010 | Sibbald | G10K 11/17885 381/71.6 |
| 2010/0299145 A1 | 11/2010 | Nakadai et al. | |
| 2011/0182436 A1* | 7/2011 | Murgia | H04R 3/005 381/71.1 |
| 2012/0084084 A1* | 4/2012 | Zhu | G10L 21/0208 704/233 |
| 2012/0310640 A1* | 12/2012 | Kwatra | G10K 11/17825 704/233 |
| 2014/0226836 A1* | 8/2014 | Miyatake | G10L 21/0232 381/94.1 |
| 2014/0278385 A1* | 9/2014 | Fan | H04R 3/005 704/226 |
| 2014/0278393 A1* | 9/2014 | Ivanov | G10L 21/0364 704/233 |
| 2016/0063997 A1* | 3/2016 | Nemala | G10L 25/06 704/233 |
| 2017/0076721 A1 | 3/2017 | Bargetzi et al. | |
| 2017/0127177 A1* | 5/2017 | Paquier | H04R 3/005 |
| 2017/0330583 A1 | 11/2017 | Lee et al. | |
| 2018/0137876 A1 | 5/2018 | Sun et al. | |
| 2018/0350379 A1 | 12/2018 | Wung et al. | |

FOREIGN PATENT DOCUMENTS

| | | |
|---|---|---|
| JP | 5034605 B2 | 9/2012 |
| KR | 10-0413797 B1 | 12/2003 |
| KR | 10-0446626 B1 | 9/2004 |
| KR | 10-1658908 B1 | 9/2016 |
| KR | 10-2018-0093363 A | 8/2018 |

OTHER PUBLICATIONS

International Search Report dated Apr. 17, 2020 in connection with International Patent Application No. PCT/ KR2019/018110, 3 pages.

Written Opinion of the International Searching Authority dated Apr. 17, 2020 in connection with International Patent Application No. PCT/KR2019/018110, 6 pages.

European Patent Office, "Supplementary European Search Report" dated Sep. 29, 2021, in connection with European Patent Application No. 19902192.4, 10 pages.

* cited by examiner

HOME APPLIANCE AND METHOD FOR VOICE RECOGNITION THEREOF

CROSS-REFERENCE TO RELATED APPLICATION

This application is based on and claims priority under 35 U.S.C. § 119 to Korean Patent Application No. 10-2018-0170454, filed on Dec. 27, 2018, in the Korean Intellectual Property Office, the disclosure of which is incorporated by reference herein in its entirety.

BACKGROUND

1. Field

The disclosure relates to a home appliance and a voice recognition method thereof. More particularly, the disclosure relates to a home appliance for estimating noise that is generated by the home appliance and improving voice recognition rate by reducing the estimated noise, and a voice recognition method thereof.

2. Description of Related Art

A home appliance may perform various functions according to a control command of a user. A recent home appliance not only may receive a control command through an input device such as a keypad, a remote controller, or the like, but also employ a voice recognition function for receiving a control command through a user's voice.

When a user utters a specific start command (for example, Bixby), a home appliance applied with a method for activating a voice recognition function in response to a specific start command has been expanded.

Some home appliances, such as a robot cleaner or a washing machine, may generate large magnitude noise by itself. This large magnitude noise has been difficult to be processed with a related-art noise removal method.

Accordingly, there is an increased need for a method of removing noise that can be applied to a home appliance that generates large magnitude noise.

SUMMARY

Provided are a home appliance for estimating noise generated by itself and improving voice recognition rate by reducing the estimated noise, and a voice recognition method.

According to an embodiment, a home appliance including a motor includes a first microphone that is disposed on a surface of a housing, a second microphone that is disposed on an inside of the housing, and a processor configured to perform signal processing for first voice data that is acquired from the first microphone, and perform voice recognition using the signal-processed first voice data, and the processor is further configured to generate noise data using second voice data that is acquired from the second microphone and perform signal processing for the first voice data using the generated noise data.

A method of voice recognition of a home appliance according to an embodiment may include acquiring first voice data from a first microphone that is disposed on a surface of a housing, acquiring second voice data from a second microphone that is disposed inside the housing, performing signal processing for first voice data that is acquired from the first microphone, and performing voice recognition using the signal-processed first voice data, and the performing signal processing may include generating noise data using second voice data that is acquired from the second microphone and performing signal processing for the first voice data using the generated noise data.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
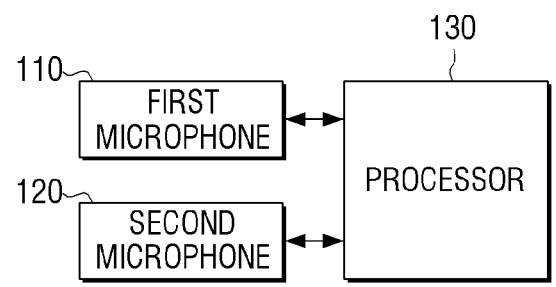
FIG. 1 illustrates a block diagram provided to describe a simple configuration of a home appliance according to an embodiment.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the disclosure will be further described with reference to the accompanying drawings.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

One or more specific embodiments of the disclosure are illustrated in the drawings and are described in detail in the detailed description. However, it is to be understood that the disclosure is not limited to the one or more specific embodiments, but includes all modifications, equivalents, and substitutions without departing from the scope and spirit of the disclosure. Also, well-known functions or constructions are not described in detail since they would obscure the disclosure with unnecessary detail.

Terms such as the first and second may be used for describing various components but not should be limited by the terms. The terms are used merely for the purpose of distinguishing one component from another component.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

Hereinafter, embodiments will be described in detail with reference to the accompanying drawings so that those skilled in the art may easily carry out the embodiments. However, the disclosure may be embodied in many different forms and is not limited to the embodiments described herein. In order to clearly illustrate the disclosure in the drawings, portions which are not related to the description have been omitted.

Hereinafter, embodiments of the disclosure will be described in detail with reference to the accompanying drawings.

FIG. 1 illustrates a block diagram provided to describe a simple configuration of a home appliance according to an embodiment.

Referring to FIG. 1, a home appliance 100 may include a first microphone 110, a second microphone 120, and a processor 130.

The home appliance is an electrical equipment for a home use and may include a robot cleaner, a vacuum cleaner, an electric range, a gas range, a microwave oven, a range hood, a washing machine, a drier, a refrigerator, a dish washer, an air-conditioner, or the like. The home appliance 100 may generate vibration and noise while performing an intrinsic function.

The home appliance 100 is a device that may perform a voice recognition function and perform a function according to a voice recognition result. Here, the voice recognition means technology to convert an acoustical signal of an input voice to a word or a sentence.

The home appliance 100 may sense the uttered voice of the user and perform voice recognition on the detected voice. Specifically, when a wake-up word (WUW), which is a trigger voice command for activating a voice recognition function, is detected, the home appliance 100 may activate a voice recognition function, and perform voice recognition using voice data for the input voice. The home appliance 100 may include a microphone for voice recognition function.

A microphone 110 and 120 is a device that converts sound to a sound signal and may output user's uttered voice and peripheral sound, or the like, to a voice signal. The home appliance 100 according to an embodiment may include a plurality of microphones 110 and 120. For example, the home appliance 100 may include the first microphone 110 and the second microphone 120.

In this disclosure, it has been illustrated and described that the home appliance 100 includes two microphones, but in implementation, the home appliance 100 may include three or more microphones.

The first microphone 110 may be disposed on a surface of a housing. To be specific, the first microphone 110 may be disposed on the surface of the housing, in order to collect uttered voice of a user, and generate first voice data corresponding to peripheral sound of the home appliance 100.

The second microphone 120 may be disposed within the housing. Specifically, the second microphone 120 may be disposed in the inside of the housing (specifically, around a noise source generating noise such as a motor) can generate second voice data corresponding to the sound generated by the home appliance 100 by in order to collect noise sound generated from the home appliance 100 itself.

The processor 130 controls the home appliance 100. To be specific, the processor 130 may control each configuration of the home appliance 100 according to a user's control command. For example, when the home appliance 100 is a washing machine, when a dehydration command is received, the processor 130 may control an operation of a motor so as to provide rotational force to a drum that accommodates laundry.

The processor 130 may perform voice recognition using the first voice data obtained through the first microphone 110. The first voice data may include noise as well as a user's voice, and the voice recognition rate may be degraded by the included noise.

The processor 130 may perform pre-processing for the first voice data. Here, the pre-processing refers to a series of signal processing that is performed prior to voice recognition and may remove noise included in the voice data.

At this time, the pre-processing operation for the first voice data of the processor 130 can be performed using the second voice data. Specifically, the processor 130 may generate noise data, which is sound data corresponding to the pure noise of the noise source in the home appliance 100 using the second voice data, and perform pre-processing by removing the noise included in the first voice data using the generated noise data.

The operation of generating noise data using the second voice data described above is based on characteristics with the second voice data. Specifically, the second voice data has a characteristic including noise of a noise source having a magnitude larger than a noise source included in the first voice data due to a position in which the second microphone 120 is disposed.

The user's uttered voice and other noise may also be included in the second voice data, but the second voice data is the data obtained through the second microphone 120 located near the noise source, and the user's uttered voice and other noise included in the second voice data may have a relatively small magnitude relative to noise of the noise source.

By these characteristics, when the second voice data is used, a component corresponding to the noise of the noise source may be extracted more accurately compared to a case of using the first voice data.

The processor 130 may use a noise path estimation filter to generate noise data. Here, the noise path estimation filter means a filter for filtering components other than the noise source noise included in the second voice data. At this time, the noise path estimation filter may be referred to a filtering algorithm.

For example, when the second voice data is input to the noise path estimation filter, user's utterance component included in the second voice data may be filtered and noise data may be output. A specific operation of generating noise data using the noise path estimation filter will be described with reference to FIGS. 3 to 7.

The processor 130 may remove the component corresponding to the noise of the noise source of the first voice data, using the noise data generated through the noise path estimation filter, and may perform pre-processing for the first voice data.

In the related art, for pre-processing, beamforming technology has been used in which a plurality of voice signals including voice and noise are acquired through a plurality of microphones, and noise is removed by distinguishing voice from noise using a characteristic that an incident direction and frequency spectrum of voice and noise are different, respectively.

However, if the magnitude of the noise is larger than the magnitude of the voice in the real environment, it is difficult to identify the expected directional difference or spectral difference, and thus it is difficult to distinguish voice from noise by the related-art. For example, in case of a home appliance that generates large magnitude noise by itself, since the magnitude of the noise is larger compared to the magnitude of the uttered voice of the user, it is difficult to remove sufficient noise for voice recognition by the related-art.

However, in the disclosure, the second voice data is acquired using a microphone disposed on a path that is nearby the noise source or disposed on a path from the noise source to the microphone disposed on the housing surface, and preprocessing is performed using the acquired second voice data and thus, even when there is a noise source inside the home appliance, and even if the noise is loud, there is the effect of accurately removing the noise from the voice data by clearly grasping the information on the noise of the noise source.

It has been illustrated described a simple configuration constituting the electronic apparatus, but in implementation, various configurations may be additionally provided. This will be described with reference to FIG. 2.

Figure 2:
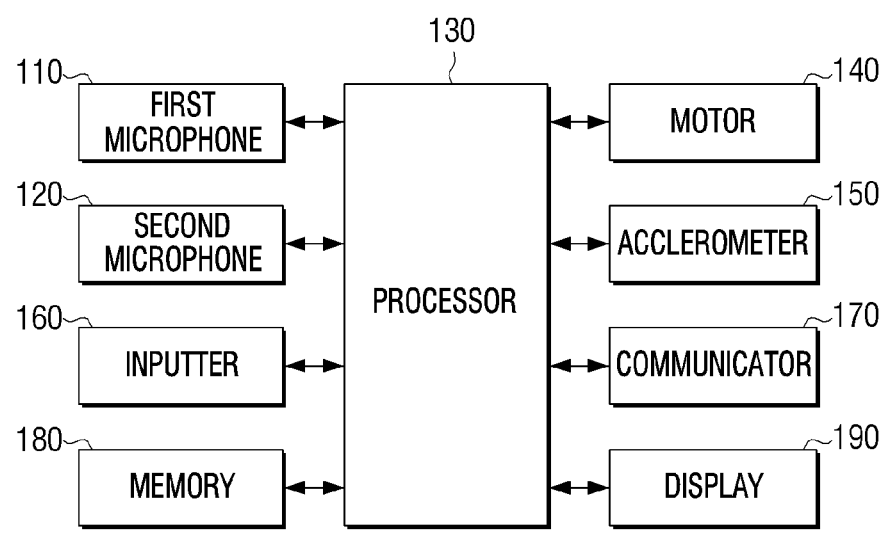
FIG. 2 illustrates a block diagram illustrating a specific configuration of a home appliance according to an embodiment.

FIG. 2 is a block diagram illustrating a specific configuration of a home appliance according to an embodiment.

Referring to FIG. 2, the home appliance 100 according to an embodiment may include the first microphone 110, the second microphone 120, the processor 130, a motor 140, an accelerometer 150, an inputter 160, a communicator 170, a memory 180, and a display 190.

The first microphone 110 and the second microphone 120 perform the same function as the configuration of FIG. 1 and the overlapped description will be omitted. The processor 130 has been described with reference to FIG. 1 and the description of FIG. 1 will not be described in an overlapped manner, and the configuration added to FIG. 2 will be described below.

The motor 140 is disposed inside the home appliance 100 and drives a configuration related to performance of a function of the home appliance 100. For example, when the home appliance 100 is a washing machine, the motor 140 may rotate a drum accommodating laundry at a high speed to dehydrate the laundry. At this time, during a process where the motor 140 drives a drum, vibration and noise may be caused.

As still another example, when the home appliance 100 is a refrigerator, the motor 140 may drive a refrigerant compressor for generating a refrigerant. In the process of driving the refrigerant compressor by the motor 140, vibration and noise may be generated.

As such, the motor 140 may correspond to a noise source when the home appliance generates a loud noise by itself. Therefore, the second microphone 120 is disposed in the vicinity of the motor 140 or on the path from the motor 140 to the first microphone 110 to detect the sound generated by the motor 140, and generate the second voice data corresponding thereto.

The processor 130 may generate noise data that is data obtained by extracting a component corresponding to the noise of the motor 140 from the second voice data using the noise path estimation filter. The pre-processing of the first voice data may be performed by removing a component corresponding to the noise of the motor 140 from the first voice data by using the generated noise.

As such, the processor 130 may use the reference data (specifically, the second voice data) to generate noise data corresponding to noise of the noise source. Meanwhile, it is also possible for the processor 130 to generate noise data corresponding to noise of the noise source using different reference data other than the second voice data.

Here, as for the reference data, data including information of the noise source is enough. The information of the noise source includes the magnitude and phase of the vibration generated from the noise source, the magnitude and phase of the noise generated from the noise source, major frequency information, or the like.

For example, the processor 130 may generate noise data by acquiring reference data through the accelerometer 150 or by acquiring reference data through a control command that is input through the inputter 160. A specific operation will be described below.

The accelerometer 150 is a device for measuring acceleration of an object. The accelerometer 150 may be disposed nearby the motor 140 for measuring the acceleration of the motor 140 and generate information on the measured acceleration.

The processor 130 may extract operating frequency of the motor 140 from the obtained acceleration information and generate reference data using the extracted operating frequency.

For example, if 50 Hz is extracted from the acceleration information obtained from accelerometer 150 as the operating frequency of motor 140, processor 130 may use 50 Hz to generate reference data represented by a trigonometric function having a specific magnitude and phase.

The inputter 160 may include a plurality of function keys for enabling a user to set or select various functions supported by the home appliance 100. This allows the user to input various control commands for the home appliance 100. For example, if the home appliance 100 is a washing machine, the user may input a dehydration command of the washing machine through the inputter 160.

The control command that is input through the inputter 160 may be related to driving of the motor 140. In this case, the operating frequency of the motor 140 that corresponds to a control command input through the inputter 160 may be confirmed.

For example, if the home appliance 100 is a washing machine and dehydration command is input, the motor 140 may rotate a drum of a washing machine in order to perform a dehydration function. In this case, it may be identified that the operational frequency of the motor 140 corresponding to the dehydration command is 50 Hz.

The processor 130 may generate the reference data using the operating frequency of the motor 140 corresponding to the control command.

The above may be applied not only to a control command inputted to the inputter 160 but also to a control command generated by the processor 130 by itself according to determination of a circumstance in the same manner.

As described above, the noise data can be generated using at least one of the second voice data acquired through the second microphone 120, the acceleration information of the accelerometer 150, or the reference data generated by using the operational frequency identified from the control command. The pre-processing of the first voice data can be performed using the noise data.

The processor 130 may change the pre-processing method for the first voice data according to whether to drive the motor 140.

Specifically, if motor 140 is being driven, the processor 130 can perform pre-processing on the first voice data using the reference data according to the above-described method since the noise generated by the home appliance 100 is large.

If the motor 140 is not being driven, there is no noise that is generated by the home appliance 100 itself and thus, the processor 130 may directly perform voice recognition using the first voice data without using the reference data, or perform voice recognition after performing pre-processing for the first voice data according to a conventional method.

Meanwhile, in FIG. 2, it is assumed that the noise source is the motor 140, but even if the noise source corresponds to a compressor, a fan, or the like, other than the motor 140, the pre-processing method for the first voice data can be changed according to whether the noise source is driven, in the same manner.

The communicator 170 is coupled to an external device and may receive various data from an external device. Specifically, the communicator 170 may be connected to an external device through a local area network (LAN) and the Internet network, but may be connected through a universal serial bus (USB) port or a wireless communication (e.g., WiFi 802. 11a/b/g/n, NFC, Bluetooth) port. Here, the external device may be a PC, a notebook computer, a smart phone, a server, or the like.

The communicator 170 may receive the noise path estimation filter that is used to generate noise data from the external device. The processor 130 may generate the noise data using the received noise path estimation filter.

A specific description about receiving the noise path estimation filter from an external device will be described below with reference to FIG. 8.

A memory 180 stores various data for the operation of the home appliance 100, such as a program for processing or control of the processor 130. To be specific, the memory 180 may store a plurality of application programs driven on the home appliance 100 and data and instructions for operating the home appliance 100.

For example, the memory 180 may store the operating frequency information of the motor 140 corresponding to the control command input through the inputter 160. The processor 130 may identify the operating frequency corresponding to the input control command and generate reference data using the identified operating frequency.

The memory 180 is accessed by the processor 130, and data reading/writing/modifying/deleting/updating, or the like, by the processor 130 may be performed. The memory 180 may be implemented not only as a storage medium in the home appliance 100 but also as an external storage medium, a removable disk including a USB memory, a web server through a network, or the like.

The memory 180 may store the noise path estimation filter that is used for generating the noise data.

The display 190 may display various information provided by the home appliance 100. To be specific, the display 190 may display a user interface window for displaying an operation state of the home appliance 100 or selecting a function and an option selected by a user.

For example, when the home appliance 100 is a washing machine, the display 190 may display an interface window for displaying that a washing machine is performing a dehydration operation, or for selecting how long the user operates a dehydration function.

In illustrating and describing FIG. 2, it has been illustrated and described that the noise source is a motor, but in implementation, a configuration other than a motor may correspond to the noise source, and the noise data may mean information on the noise that is generated from another configuration.

In illustrating and describing FIG. 2, it has been illustrated and described that one motor is provided, but in implementation, a plurality of motors may be provided, and noise may be estimated using reference data for each of the plurality of motors.

In addition, in illustrating and describing FIG. 2, the home appliance is illustrated and described as having both a second microphone and an accelerometer. However, in the implementation, only the accelerometer may be provided, and noise may be estimated by using the reference data obtained through the accelerometer. Alternatively, the second microphone and the accelerometer may not be provided, and noise may be estimated using reference data acquired through the inputter.

In addition, in illustrating and describing FIG. 2, it has been illustrated and described that the processor performs the operation of generating the reference data using the operating frequency of the motor, but in the implementation, a sine wave signal generator (not shown) to generate a sine wave signal by receiving the operating frequency information may be provided. In this case, the signal generated by the sine wave signal generator may be used as reference data.

In the related art, pre-processing for voice data is performed by using beamforming technology in which a plurality of signals including voice and noise are acquired through a plurality of microphones, and noise is removed by distinguishing voice from noise using a characteristic that an incident direction and frequency spectrum of voice and noise are different, respectively.

However, in a case where the magnitude of noise is larger than the magnitude of the voice, it is difficult to identify the difference of directionality or spectrum and thus, there is a problem in that the related-art method is hard to apply.

According to an embodiment, the home appliance may obtain reference data including information of a noise source by using a microphone or an accelerometer, estimate noise by using the obtained reference data, and perform preprocessing in a manner that reduces noise included in the voice data and thus, the home appliance according to an embodiment may accurately grasp noise even when the home appliance itself generates a large noise, and remove noise from the voice data and thus, the home appliance may have a high voice recognition rate.

Figure 3:
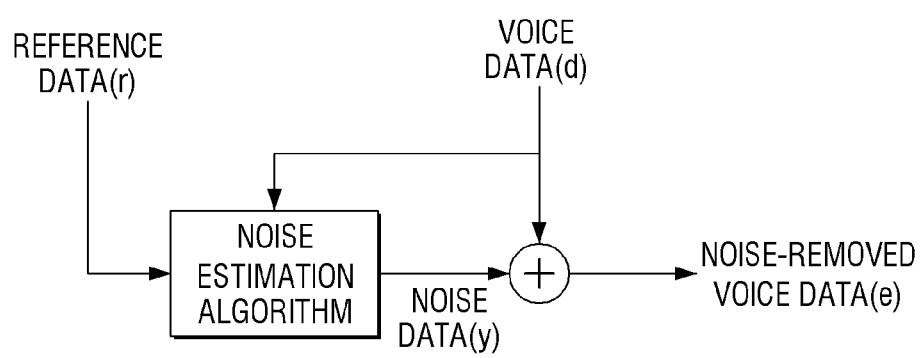
FIGS. 3 and 4 illustrate views to describe a noise removal method according to an embodiment.
Figure 4:
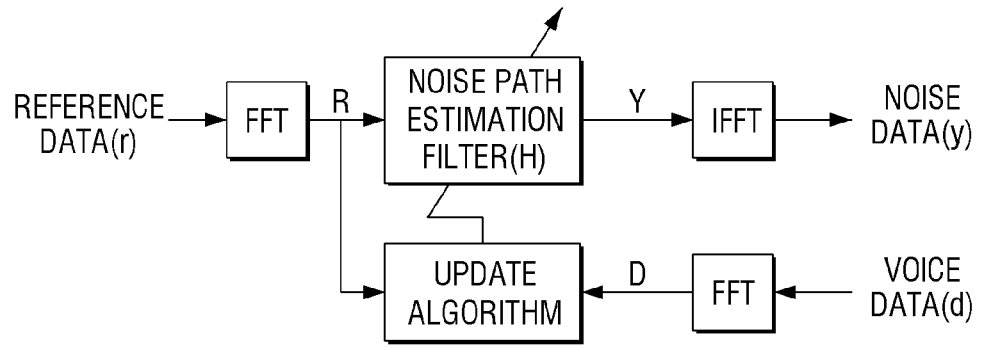

FIGS. 3 and 4 illustrate views to describe a noise removal method according to an embodiment.

Referring to FIG. 3, noise data (y) is generated using the reference data (r), voice data (d), and noise estimation algorithm, and noise of the voice data (d) is removed using the generated noise data (y).

Here, the reference data (r) may correspond to at least one of the second voice data acquired through the second microphone 120, the acceleration information of the accelerometer 150, or the reference data generated by using the operating frequency identified from the control command.

The voice data (d) may correspond to the first data acquired by the first microphone 110 of FIG. 1.

The processor 130 may generate the noise data (y) using the noise estimation algorithm and the reference data (r). Specifically, the processor 130 may extract the noise data (y), which is sound data corresponding to the noise of the noise source, from the reference data (r) using the noise path estimation filter information included in the noise estimation algorithm.

The noise path estimation filter may be implemented as a finite impulse response (FIR) filter or an infinite impulse response (IIR) filter on a time domain. Alternatively, the noise path estimation filter may be implemented in the form of a predetermined transfer function for each frequency band on the frequency domain.

The noise path estimation filter may have a linear structure such as the above example, but is not limited to, and may have a non-linear structure.

The noise path estimation filter may be fixed as one, and if a plurality of noise path filter information is pre-stored, one of a plurality of noise path estimation filters may be selected and used to generate noise data (y) according to situations.

The processor 130 may perform pre-processing on the voice data (d) by removing components corresponding to the noise of the noise source included in the voice data (d) using the generated noise data (y). The processor 130 may perform pre-processing to perform speech recognition using the voice data (e) from which noise is removed.

The processor 130 can update the generation method of the noise data (y) using the voice data (d) so as to generate accurate noise data (y) even if the noise of the source noise is changed or the surrounding environment is changed.

To be specific, the processor 130 may update the noise path filter using the voice data (d) after performing pre-processing, and this will be described with reference to FIG. 4 below.

Referring to FIG. 4, the processor 130 may identify the noise estimation algorithm which uses the noise path filter (H) on the frequency domain and perform an update using the voice data (d) including noise.

The processor 130 may transform the reference data (r) into a frequency domain using a Fast Fourier Transform (FFT). The processor 130 may apply the transformed reference data (R) to the noise path estimation filter (H) to obtain the noise data (Y, Y=R·H) transformed to the frequency domain. The processor 130 may transform the noise data (Y) into the time domain using an inverse fast Fourier transform (IFFT). The processor 130 may use the transformed noise data (y) to remove the noise of the voice data (d).

After the processor 130 performs the preprocessing, the noise path estimation filter (H) can be updated using the voice data (d) where noise is mixed. Specifically, the processor 130 may update the noise path estimation filter (H) using the correlation between the transformed voice data (D) in which the voice data (d) is transformed to the frequency domain through the FFT and the transformed reference data (R).

For example, it may be assumed that the $k-1^{th}$ noise path estimation filter is $H_{(k-1)}$, the voice data including the $k^{th}$ noise is $d_{(k)}$, the $k^{th}$ reference data is $r_{(k)}$, the voice data transformed into the $k^{th}$ frequency domain is $D_{(k)}$, and the reference data transformed into the $k^{th}$ frequency domain is $R_{(k)}$. In this case, it is possible to generate a new noise path estimation filter ($H_{(k)}$, $H_{(k)}=G_{RR(k)}·G_{DR(k)}^{(-1)}$) by multiplying the $G_{RR(k)}$, which is the auto correlation value of the $k^{th}$ transformed reference data $R_{(k)}$, and the inverse matrix of $G_{DR(k)}$ which is the cross correlation value of the voice data $D_{(k)}$ and the $k^{th}$ reference data $R_{(k)}$.

Here, $G_{RR(k)}$ is $G_{RR(k)}=(1-\lambda)·G_{RR(k-1)}+\lambda·R_{(k)}·R_{(k)}^H$ ($R_{(k)}^H$ is Hermitian matrix of the reference data ($R_{(k)}$)), $G_{DR(k)}= (1-\lambda)·G_{DR(k-1)}+\lambda·D_{(k)}·R_{(k)}^H$.

The λ value may use a constant that is determined by system or may be used by varying for the stability of the algorithm. For example, when used in a variable manner, $k^{th}$ λ value may be $\lambda_{(k)}=\alpha·(e^{f(k)}/(1+e^{f(k)}))$. It may be implemented that $f(k)=\beta·sqrt(V(k)-|M(k)|^2)/|M(k)|$, $M(k)=(1-\gamma)·M(k-1)+\gamma·D_{(k)}$, $V(k)=(1-\gamma)·V(k-1)+\gamma·D(k)·\overline{D(k)}$ (α, β and γ are constants).

When the $k+1^{th}$ reference data ($r_{(k+1)}$ and the voice data $d_{(k+1)}$ are acquired, the processor 130 may generate the noise data ($y_{(k+1)}$ from the next reference data using the updated noise path estimation filter $H_{(k)}$, and remove noise from the voice data $d_{(k+1)}$ using the generated noise data ($y_{(k+1)}$).

The method of updating the noise path estimation filter H is not limited to the above example. For example, in the above example, the update is performed whenever the voice data including the noise and the reference data are acquired, but the update may be performed when the voice data including the predetermined number of noise and the reference data are obtained. In this case, the update can be performed by using the voice data and the reference data including a predetermined number of noises together.

In addition, as illustrated and described in FIGS. 3 and 4, it has been illustrated and described that, after the processor 130 performs the pre-processing of the voice data (d) including the noise, the noise path estimation filter is updated, but in the implementation, the noise path estimation filter may be first updated, and then the pre-processing of the voice data (d) including the noise can be performed.

Figure 5:
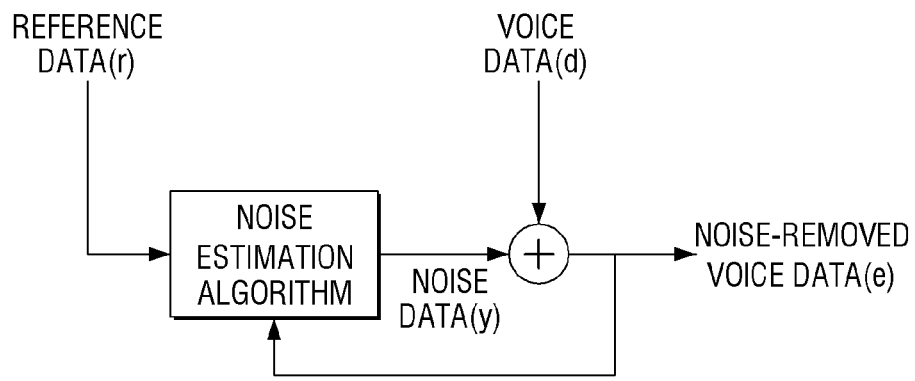
FIGS. 5 to 7 illustrate views to describe a method for noise removal according to an embodiment.
Figure 6:
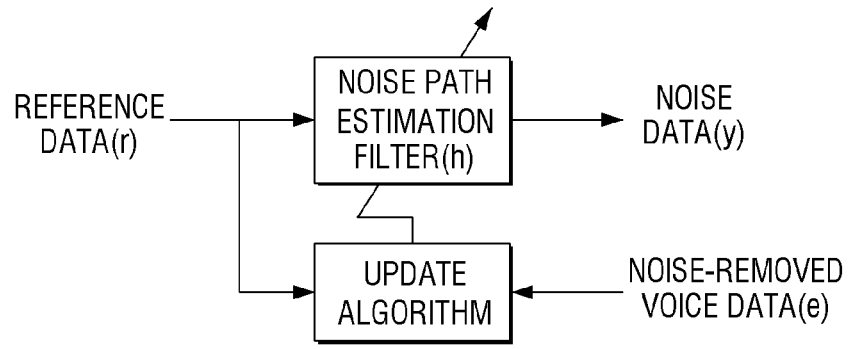
Figure 7:
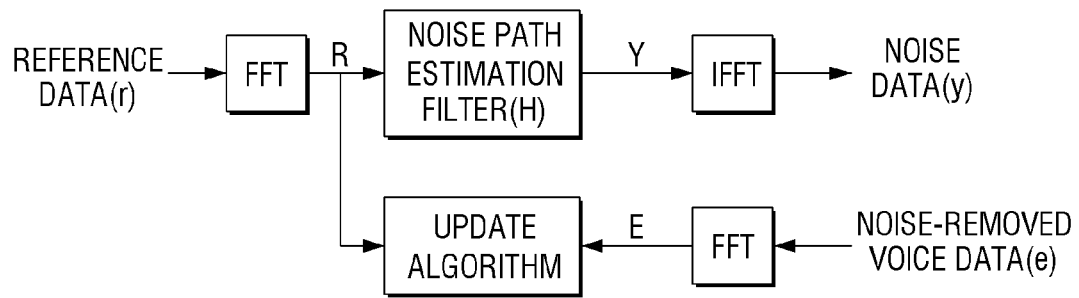

FIGS. 5 to 7 illustrate views to describe a method for noise removal according to an embodiment.

Referring to FIG. 5, the noise data y may be generated using the reference data r, the voice data e from which the noise is removed, and the noise estimation algorithm, and the noise of the voice data d may be removed using the generated noise data y.

Here, the reference data r may correspond to at least one of the second voice data obtained through the second microphone 120, the acceleration information of the accelerometer 150, or the reference data generated by using the operating frequency identified from the control command.

The voice data d may correspond to the first voice data obtained by the first microphone 110 of FIG. 1.

The processor 130 may extract the noise data y, that is the sound data corresponding to the noise of the noise source, from the reference data r using the noise path estimation filter information included in the noise estimation algorithm.

The processor 130 may perform pre-processing for the voice data d by removing an element corresponding to the noise of the noise source included in the voice data d using the generated noise data y.

The processor 130 may perform pre-processing for speech recognition using the noise-removed voice data e. A series of operations of the processor 130 are the same as the operation of the processor of FIG. 3. In addition, the configuration of the noise estimation filter is the same as that of FIG. 3, and thus a description thereof will be omitted.

The difference between an embodiment illustrated in FIG. 5 and an embodiment illustrated in FIG. 3 is a method for updating the noise path estimation filter. Specifically, in an embodiment of FIG. 5, the processor 130 may update the method of generating the noise data using the voice data from which noise is removed, rather than the voice data including noise. A detailed description thereof will be described below with respect to FIGS. 6 and 7.

Referring to FIG. 6, the noise estimation algorithm for performing update by using the noise path filter that is the FIR filter on the time domain, and performing update using the voice data from which noise is removed can be identified.

The processor 130 may apply the reference data r to the noise path estimation filter h on the time domain to obtain noise data (y, y=h*r). The processor 130 may remove the noise of the voice data d using the noise data y and perform voice recognition using the voice data e from which noise is removed.

The processor 130 may update the noise path estimation filter h using the voice data e from which the noise is removed. Specifically, after performing the preprocessing, the processor 130 can update the noise path estimation filter h using the correlation between the noise-removed voice data e and the reference data r.

For example, it may be assumed that the k-1$^{th}$ noise path estimation filter as $h_{(k-1)}$, the voice data from which k$^{th}$ noise is removed as $e_{(k)}$, and the k$^{th}$ reference data as $r_{(k)}$. In this case, the k$^{th}$ reference data $r_{(k)}$ may be stored as the buffer $r_{(k)}$ corresponding to the length of the noise path estimation filter $h_{(k-1)}$, and the new noise path estimation filter ($h_{(k)}$, $h_{(k)}$= $h_{(k-1)}$+μ·$e_{(k)}$·$r_{(k)}$) may be generated using the buffer $r_{(k)}$ and the voice data $e_{(k)}$ from which the k$^{th}$ noise is removed.

Here, μ may use the constant that is determined by the system, or may be used in a variable manner for the stability of the algorithm. For example, for the variable use, the k$^{th}$ μ may be μ(k)=α/P(k). In addition, P(k)=(1−γ)·P(k−1)+γ·r(k)$^T$·r(k)) (α and γ are constants) may be implemented.

Upon obtaining the next reference data r' and the voice data d', the processor 130 may generate the noise data y' from the next reference data using the updated new noise path estimation filter h', remove the noise of the voice data d' using the noise data y', and perform voice recognition using the voice data e' from which noise is removed.

The method of updating the noise path estimation filter h in the time domain is not limited to the above-described example. For example, in the above-described example, an update is performed every time when the voice data from which noise is removed and the reference data are updated, but it can be also implemented that the update is performed when the voice data from which the predetermined number of noise is removed and the reference data are acquired. In this case, the update may be performed by using the voice data and the reference data together with a predetermined number of noises.

The noise path estimation filter h may be a filter that is implemented as a predetermined transfer function by frequency bands on the frequency domain, instead of the FIR filter on the domain, and it may be possible to update the noise path estimation filter h using the voice signal e from which noise is removed.

Referring to FIG. 7, the noise estimation algorithm to perform update using the noise path filter on the frequency domain and using the voice data from which noise is removed may be identified.

The processor 130 may use the FFT to transform the reference data r into the frequency domain. The processor 130 may apply the transformed reference data r to the noise path estimation filter H on the frequency domain to obtain the noise data Y, Y=R·H transformed to the frequency domain. Further, the processor 130 may transform the noise data Y into the time domain using the IFFT. The processor 130 may then use the transformed noise data y to remove noise in the voice data d.

The processor 130 may update the noise path estimation filter H using the voice data e from which noise is removed. Specifically, the processor 130 may update the noise path estimation filter H using the correlation between the voice data E in which the voice data e from which noise is removed is transformed to the frequency domain through the FFT and the transformed reference data R.

For example, it may be assumed that the k-1$^{th}$ noise path estimation filter is $H_{(k-1)}$, the voice data from which k$^{th}$ transformed noise is removed is $E_{(k)}$, the reference data that is transformed to the k$^{th}$ frequency domain is $R_{(k)}$. In this case, the new noise path estimation filter ($H_{(k)}$, $H_{(k)}$=$H_{(k-1)}$+μ·$R_{(k)}^H$·$E_{(k)}$) may be generated by adding the k-1$^{th}$ noise path estimation filter $H_{(k-1)}$ and the element that is obtained by multiplying the Hermitian matrix of the reference data $R_{(k)}$ which is transformed to the k$^{th}$ frequency domain and the voice data $E_{(k)}$ from which k$^{th}$ noise is removed.

Here, μ may use the constant that is defined by the system or may be variable for the stability of the algorithm. For example, in the case of the variable use, k$^{th}$ μ may be μ(k)=α·(ef(k)/(1+ef(k)). It may be implemented that f(k)=β·sqrt(V(k)−|M(k)|2)/|M(k)|, M(k)=(1−γ)·M(k−1)+γ·D(k), V(k)=(1−γ)·V(k−1)+γ·D(k)·$\overline{D(k)}$ (α, β and γ are constants).

The processor 130 may generate the noise data ($y_{(k+1)}$) from the next reference data using the updated new noise path estimation filter H(k), when the next reference data $r_{(k+1)}$ and voice data $d_{(k+1)}$ are acquired, and may remove the noise from the voice data $d_{(k+1)}$ using the generated noise data $y_{(k+1)}$.

The method of updating the noise path estimation filter H in the frequency domain is not limited to the above-described example. For example, in the above-described example, an update is performed every time the voice data from which the noise is removed and the reference data are updated, but, it may be implemented such that the update is performed when the voice data from which the predetermined number of noise is removed and the reference data are acquired. In this case, the update may be performed using both the voice data including the predetermined number of noises and the reference data together.

In illustrating and describing FIGS. 3 to 7, it has been illustrated and described that the noise path estimation filter is updated after performing pre-processing for the voice data d including noise, but in implementation, it may be implemented that, after the noise path estimation filter is updated first, and then preprocessing for the voice data d including the noise is performed.

Figure 8:
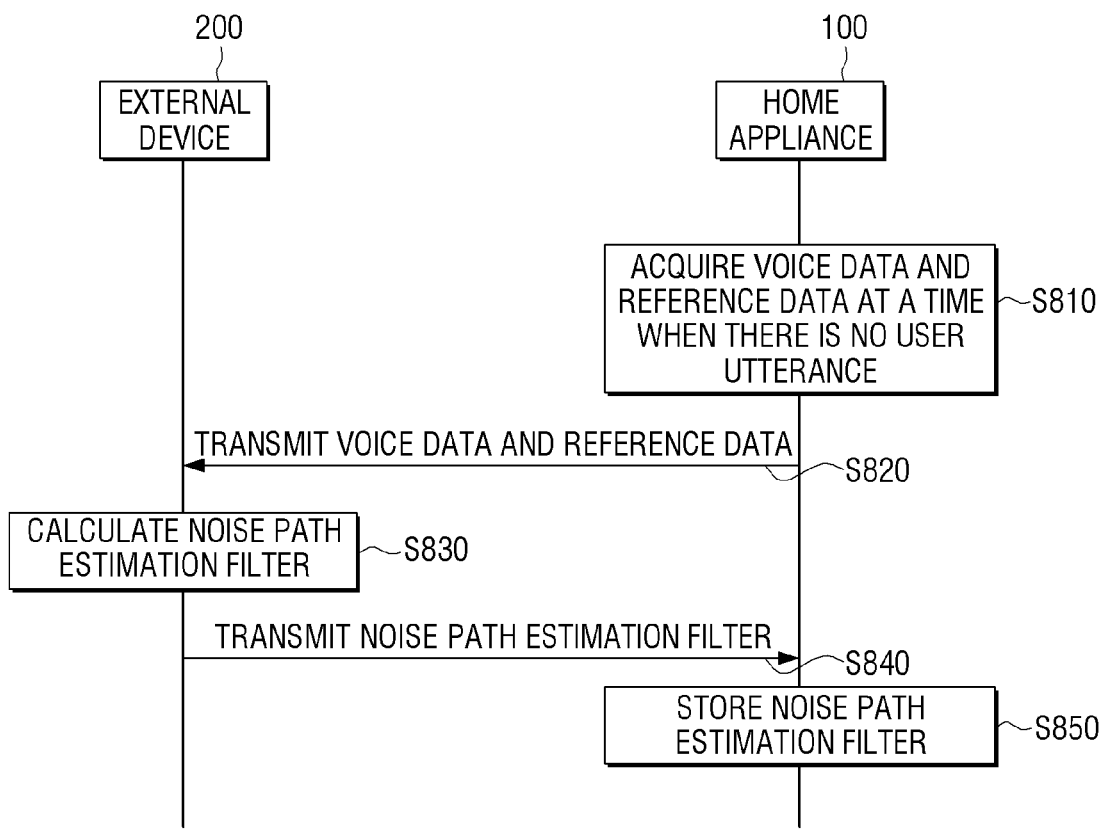
FIGS. 8 to 10 illustrates views to describe a noise removal method according to a third embodiment.
Figure 9:
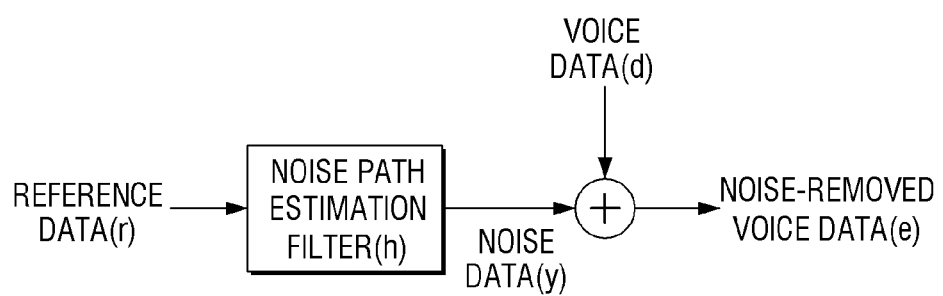
Figure 10:
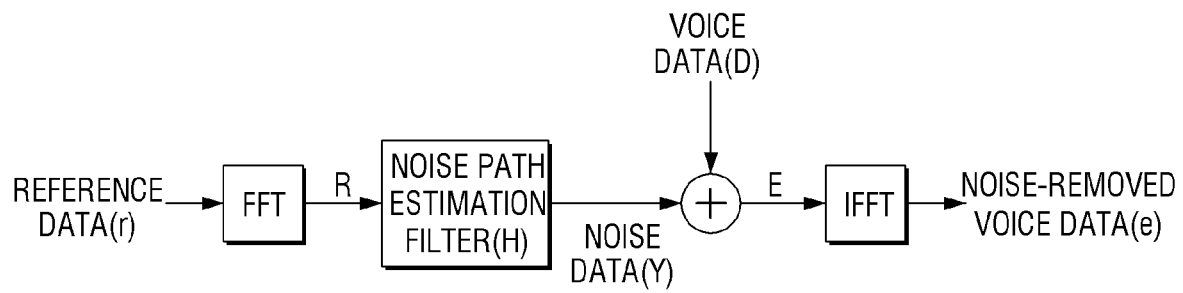

FIGS. 8 to 10 illustrate views to describe a noise removal method according to an embodiment.

The information on the noise path estimation filter may be previously stored in the home appliance 100 and used to generate noise data as described above. However, the noise path estimation filter may not be pre-stored in the manufacturing stage of the home appliance 100, but may be implemented in a manner that is generated through an artificial intelligence (AI) model after the home appliance 100 is installed in a home. The home appliance 100 may perform noise removal using the generated noise path estimation filter.

Hereinbelow, for convenient description, it is assumed and described that the home appliance obtains the noise path estimation filter from an external device 200 including the AI model.

Referring to FIG. 8, first, the home appliance 100 may obtain voice data and reference data at a time when there is no user utterance in operation 5810. Specifically, in order to generate a noise path estimation filter, voice data and reference data in which no user utterance is detected and only noise of a noise source are detected are used. Therefore, when the home appliance 100 performs voice recognition and identifies the voice data determined to have no user utterance, the home appliance 100 may identify the reference data acquired at the same time as the corresponding voice data.

The home appliance 100 may transmit the acquired voice data and the reference data to the external device 200 through the communicator 170 in operation 5820. To be specific, the home appliance 100 may transform the acquired voice data and the reference data to a signal on the time domain or the frequency domain and transmit the same to the external device 200.

The noise of the noise source of the home appliance 100 may become different according to a change in an operation mode or peripheral environment of the home appliance 100. Therefore, it is necessary to generate the noise estimation filter for applying to each case. For this, the home appliance 100 may transmit information on an operation mode or information on a peripheral environment together, when information is transmitted to the external device 200.

For example, when the home appliance 100 is a washing machine, the rotational speed of a motor included in the washing machine may be different according to an operation mode. Therefore, the magnitude or characteristic of noise of the noise source (motor) may be different according to an operation mode.

By transmitting information on an operation mode of each of the home appliance 100, voice data and reference data obtained for each operation mode together, the noise path estimation filter which the external device 200 may apply for each operation mode may be generated.

The external device 200 may calculate the noise path estimation filter using the received voice data and the reference data in operation 5830. Specifically, the external device 200 may obtain the noise path estimation filter using an AI model that receives voice data and reference data and outputs the noise path estimation filter corresponding thereto. Here, the AI model may be a linear regression model.

The external device 200 may transmit the calculated information on the noise path estimation filter to the home appliance 100 in operation 5840. The home appliance 100 may store the received information on the noise path estimation filter in operation 5850.

The home appliance 100 may generate noise data using the acquired reference data and the noise path estimation filter information, and may remove noise of the voice data including user utterance using the generated noise data. The voice recognition function can be performed using the noise-removed voice data.

In illustrating and describing FIG. 8, it has been illustrated and described that the voice data and the reference data are transmitted to the external device and the noise path estimation filter generated by the AI model is received from the external device, but in implementation, it may be implemented that the processor of the home appliance generates the noise path estimation filter by using the prestored AI model.

Alternatively, it may be implemented that a separate device in the home appliance that is distinguished from the processor may generate the noise path estimation filter using the prestored AI model, and the processor uses the generated noise path estimation filter. A method for generating the noise path estimation filter is not limited thereto.

Hereinbelow, a specific operation of removing noise using the noise path filter that is generated using the AI model will be described.

Referring to FIG. 9, a method for noise removing using the noise path filter h on the time domain may be identified.

The processor 130 may perform noise removal using the noise path filter information h received from the external device 200.

Specifically, the processor 130 may apply the reference data r to the received noise path estimation filter h to obtain the noise data (y, y=h*r). The processor 130 may remove the noise of the voice data d using the noise data y and perform voice recognition using the noise-removed voice data e.

Referring to FIG. 10, a method for removing noise using the noise path filter on the frequency domain may be identified.

The processor 130 may use the FFT to transform the reference data r into the frequency domain. The processor 130 may apply the transformed reference data R to the noise path estimation filter H to obtain the noise data (Y, Y=R·H) transformed into the frequency domain.

The processor 130 may remove the noise of the voice data D transformed through the FFT using the noise data Y. Further, the processor 130 can transform the noise-canceled voice data E into the time domain using the IFFT. The processor 130 may perform voice recognition using the noise-removed voice data e.

In illustrating and describing FIGS. 9 and 10, it has been illustrated and described that update for the noise path estimation filter is not performed, but in implementation, it may be implemented that update for the noise path estimation filter is performed according to the aforementioned update method.

Figure 11:
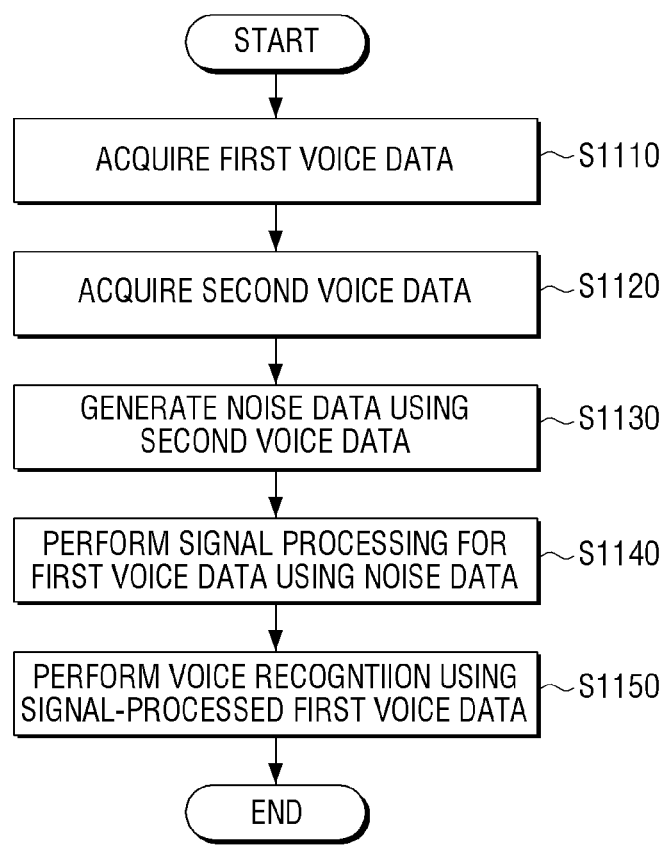
FIG. 11 illustrates a flowchart to describe a method for voice recognition of a home appliance according to an embodiment.

FIG. 11 illustrates a flowchart to describe a method for voice recognition of a home appliance according to an embodiment.

Referring to FIG. 11, a method for recognizing a voice of a home appliance, which generates large noise, can be identified. Here, the home appliance may correspond to, but is not limited to, a robot cleaner, a vacuum cleaner, an electric range, a gas range, a radio oven, a range hood, a washing machine, a dryer, a refrigerator, a dish washer, an air conditioner, or the like.

First of all, the first voice data is obtained in operation S1110. To be specific, the first voice data may be obtained from a first microphone that may be disposed on a surface of housing of the home appliance.

The second voice data is obtained in operation S1120. To be specific, the second voice data may be obtained from a second microphone that may be disposed inside the housing of the home appliance.

More specifically, the second microphone may be disposed nearby the noise source inside the home appliance or on a path from the noise source to the first microphone, for detecting noise generated from the noise source and generate the second voice data corresponding thereto.

The noise source inside the home appliance may be a motor, a compressor, a fan, or the like, and is not limited thereto.

The noise is generated using the second voice data in operation 51130. Here, the noise data means sound data corresponding to noise of the noise source. For example, when the noise source of a home appliance is a motor, the noise data may be sound data corresponding to noise of the motor.

The noise data may be obtained by extracting only a component that corresponds to the noise of the noise source from the second voice data or filtering a component other than the components corresponding to the noise of the noise source.

The noise data may be generated by filtering out other components other than the component corresponding to the noise source included in the second voice data using at least one of a finite impulse response (FIR) filter or an infinite impulse response (IIR) filter on the time domain.

Alternatively, the noise data may extract the component corresponding to the noise of the noise source from the second voice data using the transfer function that is predetermined by frequency bands on the frequency domain.

The information on the filter or transfer function is prestored in the home appliance in the manufacturing stage and may be used for generating noise data, but is not limited thereto.

For example, when communication with an external device is possible, information on the filter or transfer function may be received through communication with an external device and noise data may be generated using the received information on the filter or transfer function.

At this time, the received information on the filter or transfer function may be information that is acquired using the AI model included in the external device.

If the noise source of the home appliance is a motor and the appliance has an accelerometer, it is possible to obtain acceleration information for the motor from the accelerometer. An operating frequency may be extracted from the obtained acceleration information, and a reference signal may be generated by using the extracted operating frequency. The reference signal may correspond to the second voice data obtained through the second microphone. The noise data may be generated according to the above-described method using the reference signal.

In addition, when the noise source of the home appliance is a motor and the control command input to the input device is related to the driving of the motor, the operating frequency of the motor corresponding to the control command can be extracted by using the control command, and the reference signal can be generated by using the extracted operating frequency. The reference signal may correspond to the second voice data obtained through the second microphone. The noise data can be generated according to the above-described method using the reference signal.

Signal processing for the first voice data is performed using the noise data in operation 51140. To be specific, signal processing to remove a component corresponding to the noise of the noise source included in the first voice data using the noise data may be performed.

Voice recognition is performed using the signal-processed first voiced data in operation 51150.

When the noise source is the motor, the signal processing method for the first voice data may change according to whether the motor is driven.

Specifically, when the current motor is driven, noise generated by the home appliance itself is large, the pre-processing for the first voice data may be performed using the reference data according to the above method.

If the current motor is not driven, since there is no noise generated by the home appliance, it is possible to immediately perform voice recognition by using the first voice data without using the reference data, or perform pre-processing on the first voice data according to the conventional method, and then perform voice recognition.

The method for generating noise data may be updated using at least one of the first voice data including noise or the first voice data which is signal-processed so as to generate accurate noise data, even when the noise of the noise source is changed or peripheral environment is changed.

To be specific, a method for generating noise data may be updated using the correlation between at least one of the first voice data or the signal-processed first voice data and the second voice data.

Therefore, the voice recognition method of the home appliance of the disclosure may acquire the reference data including information of a noise source by using a microphone or an accelerometer, estimate noise by using the obtained reference data, and perform preprocessing in a manner that reduces noise included in the voice data, thus having an effect of having a high voice recognition rate even when the home appliance generates a large noise. The voice recognition method as shown in FIG. 11 can be performed on the home appliance having the configuration of FIG. 1 or FIG. 2, and can be executed on the home appliance having the other configuration.

The voice recognition method as described above may be implemented as at least one execution program for executing the aforementioned voice recognition method, or the execution program may be stored in a non-transitory readable medium.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While various embodiments have been illustrated and described with reference to certain drawings, the disclosure is not limited to specific embodiments or the drawings, and it will be understood by those of ordinary skill in the art that various changes in form and details may be made therein without departing from the spirit and scope as defined, for example, by the following claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A home appliance comprising:
   a first microphone disposed on a surface of a housing;
   a second microphone disposed on an inside of the housing; and
   a processor configured to:
      perform first signal processing for first voice data, the first voice data acquired from the first microphone,
      generate noise data using second voice data, the second voice data acquired from the second microphone,
      perform second signal processing for the first voice data using the generated noise data,
      determine whether a noise source is being driven, and
      perform voice recognition, based on whether the noise source is being driven, using the first signal processed first voice data or the second signal processed first voice data,
   wherein the processor is further configured to:
      based on the noise source being driven, perform the voice recognition using the second signal processed first voice data, and
      based on the noise source not being driven, perform the voice recognition using the first signal processed first voice data.

2. The home appliance of claim 1, further comprising:
   a motor disposed in a housing of the home appliance, the motor configured to perform a predetermined function of the home appliance,
   wherein the generated noise data includes noise data for the motor,
   wherein the processor is further configured to perform the second signal processing to remove motor noise with respect to the first voice data using the generated noise data for the motor.

3. The home appliance of claim 2, wherein the processor is further configured to:
   based on the motor being driven, perform the voice recognition using the second signal processed first voice data; and
   based on the motor not being driven, perform the voice recognition using the first voice data.

4. The home appliance of claim 1, wherein the processor is further configured to update a method for generating the noise data using at least one of the first voice data or the first signal processed first voice data.

5. The home appliance of claim 4, wherein the processor is further configured to update the method for generating the noise data using a correlation between:
   at least one of the first voice data or the first signal processed first voice data; and
   the second voice data.

6. The home appliance of claim 1, wherein the processor is further configured to generate the noise data using at least one of:
   a finite impulse filter; or
   an infinite impulse filter.

7. The home appliance of claim 1, wherein the processor is further configured to:
   transform the second voice data to a frequency domain; and
   generate the noise data using the transformed second voice data and a predetermined transfer function by frequency bands.

8. The home appliance of claim 1, further comprising a communicator configured to be communicable with an external device,
   wherein the processor is further configured to, based on receiving filter information to generate the noise data from the external device through the communicator, generate the noise data using the received filter information,
   wherein the received filter information is acquired using an artificial intelligence model included in the external device.

9. The home appliance of claim 1, wherein the home appliance is at least one of a robot cleaner, a vacuum cleaner, an electric range, a gas range, a radio wave oven, a range hood, a washing machine, a dryer, a refrigerator, a dishwasher, or an air-conditioner.

10. A method of voice recognition of a home appliance, the method comprising:
    acquiring first voice data from a first microphone, the first microphone disposed on a surface of a housing;
    acquiring second voice data from a second microphone, the second microphone disposed inside the housing;
    performing signal processing for first voice data acquired from the first microphone,
    wherein the performing of the signal processing comprises:
       generating noise data using the second voice data acquired from the second microphone; and
       performing additional signal processing for the first voice data using the generated noise data;
    determining whether a noise source is being driven; and
    performing voice recognition, based on whether the noise source is being driven, using the signal processed first voice data or the additional signal processed first voice data,
    wherein performing the voice recognition further comprises:
       based on the noise source being driven, performing the voice recognition using the additional signal processed first voice data; and
       based on the noise source not being driven, performing the voice recognition using the first signal processed first voice data.

11. The method of claim 10, wherein:
    the home appliance further comprises a motor disposed in the housing of the home appliance, the motor configured to perform a predetermined function of the home appliance;

the generated noise data includes noise data for the motor; and the performing the additional signal processing comprises performing signal processing to remove motor noise with respect to the first voice data using the generated noise data for the motor.

12. The method of claim 11, further comprising:
identifying whether the motor is driven, and
based on the motor not being driven, performing the voice recognition using the first voice data.

13. The method of claim 10, further comprising updating a method for generating the noise data using at least one of the first voice data or the signal processed first voice data.

14. The method of claim 13, wherein the updating comprises updating the method for generating the noise data using a correlation between:
at least one of the first voice data or the signal processed first voice data; and
the second voice data.

15. The method of claim 10, wherein the generating the noise data comprises generating the noise data using at least one of:
a finite impulse filter; or
an infinite impulse filter.

16. The method of claim 10, wherein the generating the noise data comprises:
transforming the second voice data to a frequency domain; and
generating the noise data using the transformed second voice data and a predetermined transfer function by frequency bands.

17. The method of claim 10, further comprising receiving filter information to generate the noise data from an external device,
wherein the generating the noise data comprises generating the noise data using the received filter information,
wherein the received filter information is acquired using an artificial intelligence model included in the external device.

18. The method of claim 10, wherein the home appliance is at least one of a robot cleaner, a vacuum cleaner, an electric range, a gas range, a radio wave oven, a range hood, a washing machine, a dryer, a refrigerator, a dishwasher, or an air-conditioner.

* * * * *